Feb. 17, 1970     H. S. McLIMORE     3,495,691

OVERSPEED BRAKE

Filed May 20, 1968

INVENTOR.
Henry S. McLimore
BY
Paul Fitzpatrick
ATTORNEY

United States Patent Office 3,495,691
Patented Feb. 17, 1970

3,495,691
OVERSPEED BRAKE
Henry S. McLimore, Indianapolis, Ind., assignor to General Motors Corporation, Detroit, Mich., a corporation of Delaware
Filed May 20, 1968, Ser. No. 730,401
Int. Cl. F01d *17/00, 7/00, 21/00*
U.S. Cl. 188—185
10 Claims

ABSTRACT OF THE DISCLOSURE

An overspeed brake for a turbine includes an outer fixed brake drum, an inner rotative member, and an intermediate member mounted on the rotative member adapted to frictionally engage the brake drum upon overspeed of the turbine. The intermediate member has structure which causes it to expand differentially upon overspeed to engage the fixed brake drum, and there is a ramp connection between the rotative member and the intermediate member which causes further energization of the brake upon such engagement.

---

The invention herein described was made in the course of work under a contract or subcontract thereunder with the Department of Defense.

My invention relates to overspeed brakes, particularly to an improved self-energizing centrifugal overspeed brake. The invention is particularly adapted to preventing destructive overspeed of turbines and is so disclosed, although the invention has other fields of use.

It is well known that most turbines are capable of attaining a very high degree of overspeed in a very short time upon loss of the load which normally restrains the speed of the turbine. Many types of centrifugal force responsive devices which are effective to energize brakes, by-pass the turbine, or cut off the supply of motive fluid to the turbine, have been proposed to prevent the turbine reaching a speed at which the wheel may burst and destroy the turbine as well, perhaps, as project fragments of the turbine into the surrounding environment.

Examples of such proposals for overspeed controls for turbines are disclosed in the following U.S. patents: Rushmore No. 1,212,816 for Controlling Device for Turbines, Jan. 16, 1917; MacMurchy No. 1,600,346 for Turbine Overspeed Device, Sept. 21, 1926; Allingham No. 2,962,257 for Turbine Overspeed Control, Nov. 29, 1960; Carriere et al. No. 3,158,999 for Overspeed Control Means for a Gas Turbine Engine, Dec. 1, 1964; and Jones No. 3,271,005 for Mechanical Overspeed Prevention Devices, Sept. 6, 1966.

My invention is directed to the provision of a very simple and effective overspeed brake having self-energizing features particularly adapted to provide a simple, reliable, and inexpensive brake to prevent dangerous or disastrous overspeed of a turbine or other rotating machinery which may be curbed by such a brake.

The nature of my invention and the advantages thereof will be apparent to those skilled in the art from the succeeding detailed description of the preferred embodiment of the invention and the accompanying drawings.

Figure 1:
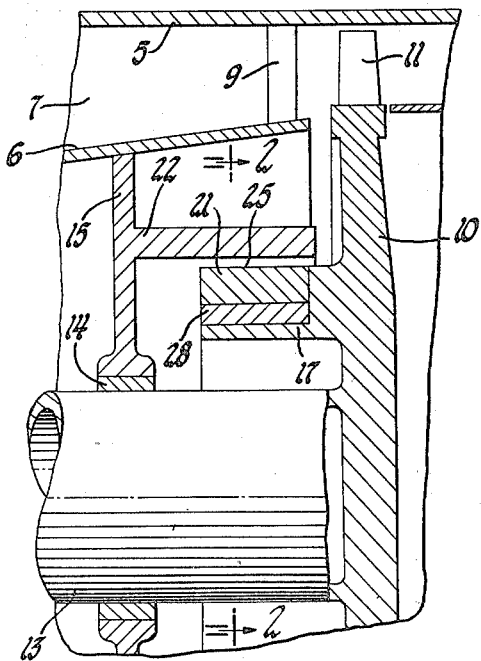
FIGURE 1 is a partial sectional view of a turbine engine, taken in a plane containing the axis of rotation of the rotor, with certain parts shown schematically.

Referring first to FIGURE 1, a turbine which may be considered as a single-stage turbine of a gas turbine engine, for example, embodies, as shown more or less schematically, an outer casing 5 and an inner casing 6, these defining between them an inlet 7 for motive fluid to the turbine. The turbine includes nozzle vanes 9 and a turbine wheel 10 bearing blades 11. Wheel 10, which normally rotates at high speed in operation of the engine, is mounted on or integral with a hollow shaft 13 which is a power transmission member to deliver the output of the turbine to a compressor or any other driven device. The turbine shaft 13 is suitably supported for rotation by means including a bearing 14 mounted in a fixed support 15 forming part of the framework of the engine.

Figure 2:
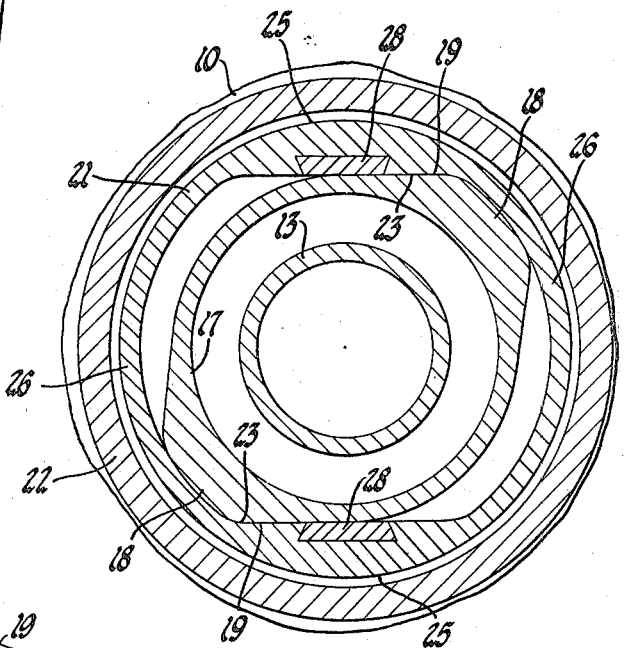
FIGURE 2 is a transverse sectional view taken on the plane indicated by the line 2—2 in FIGURE 1 showing the brake in inoperative condition.

The input to the brake from the turbine in this embodiment is accomplished by a rotative member 17 projecting from the turbine wheel concentric with the shaft 13 and preferably integral with the wheel. As shown more clearly in FIGURES 2 and 3, the member 17 may have an interior surface which is of circular cross section but its outer surface includes preferably two cams 18 with ramp surfaces 19 extending from the lesser exterior diameter of the rotative member to the cam portion 18. The turbine brake also includes a braking ring 21 mounted on the exterior of the rotative member 17 and preferably having a cylindrical outer surface. As shown in FIGURE 2, the interior of the braking ring 21 fits against the cams 18 and may be an easy press fit on the cams. An annular, preferably cylindrical, brake drum 22 extends from the fixed structure of the engine such as the support 15 so as to be concentric with the outer surface of the braking ring and very slightly spaced therefrom when the engine is nonrotative. The slight clearance between the outer surface of braking ring 21 and the inner surface of brake drum 22 is greatly exaggerated in the drawings. In practice, the expansion of the braking ring into engagement with the brake drum may be only a matter of two or three hundredths of an inch.

Figure 3:
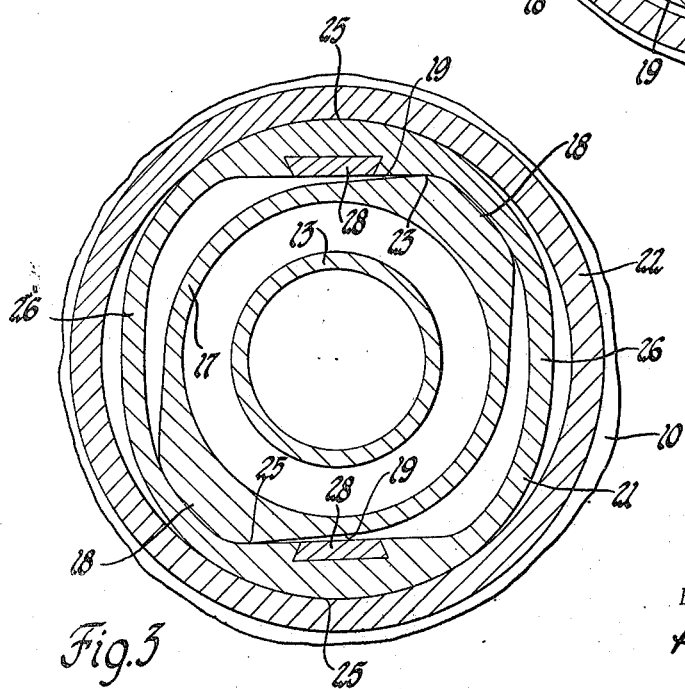
FIGURE 3 is a view taken on the same plane as FIGURE 2 showing the brake in engaged condition.

As shown in FIGURES 2 and 3, the shaft 13, cam 18, and braking ring 21 rotate counterclockwise at relatively high speed, the speeds of turbines ordinarily being in the range from ten to fifty thousand revolutions per minute. Referring to FIGURES 2 and 3, it will be noted that the structure of the braking ring 21 varies circumferentially. The braking ring is noncircular interiorly to provide for ramp surfaces 23 adapted to cooperate with the cams 18. Also, the portions 25 of the ring 21 in advance of the cams in the direction of rotation of the structure are heavier than the remainder of the ring. The structure is such that the braking ring expands elastically with speed in advance of the cams 18 as the centrifugal force increases (see FIGURE 3). Upon the attainment of some speed significantly in excess of the maximum rated speed of the turbine, the expansion of the braking ring is such as to bring the portions 25, which may be termed "contact portions," into engagement with the brake drum. The less massive connecting portions 26 of the braking ring between the contact portions 25 may contract radially because of the pull of the heavy portions 25.

When the contact portions of the braking ring engage the brake drum, a retarding torque is established which tends to slow the turbine and also to rotate the braking ring 21 reversely with respect to the rotative member 17. As a result, as shown in FIGURE 3, the cams 18 rotate under the ramp surfaces 23 of the braking ring to further expand the braking ring at the points 25 and increase the braking effort by a self-energizing action. As a result, the brake is firmly applied with sufficient force to stop the rotation of the turbine and prevent fragmentation of the wheel.

Any suitable means to retain the braking ring 21 on the rotative member 17 when the brake engages may be provided, or friction may be relied upon, as there is no reason for the ring 21 to move axially.

FIGURES 2 and 3 show a feature desirably incorporated in my brake. The contact portions 25 of the braking ring are, of course, heavier for unit of arc than the connecting portions 26 because of the greater thickness of the steel which creates the ramp surfaces at 23. In most cases, however, I consider it preferable to provide loading inserts or weights 28 which, as indicated by the figure, are small blocks of relatively heavy metal secured to the interior of ring 21 in any suitable manner. They may, as indicated by the drawings, be pressed into axially extending dovetail slots in the ring 21. The weights 28 may be of some relatively heavy metal such as tungsten. They perform several functions. Because of the greater density they increase the centrifugal force and therefore the response of the braking ring to any given speed. They are not brazed or otherwise intimately bonded to the ring 21 and, therefore, they reduce the stiffness of the ring at the contact portions, thereby also increasing the deflection of the ring. Also, these may provide a convenient way to calibrate the device by varying the length or thickness of the weights 28.

It should be apparent to those skilled in the art that the preferred embodiment of my invention provides a very simple and effective brake which does not adversely affect the balance of the turbine wheel and which with lightweight and simple structure provides a brake with strong self-energizing characteristics adapted to prevent overspeed of the turbine and bring it to a halt upon loss of the load which normally restrains the speed of the turbine.

The detailed description of the preferred embodiment of my invention for the purpose of explaining the principles thereof is not to be considered as limiting or restricting the invention, since many modifications may be made by the exercise of skill in the art without departing from the scope of the invention.

What is claimed is:

1. An engine overspeed brake comprising, in combination, a member normally rotative at high speed in operation of the engine; a fixed brake drum disposed adjacent to the rotative member and having an internal annular braking surface; a braking ring mounted on the rotative member so as to be driven thereby and disposed within the brake drum, the braking ring having a structure varying circumferentially so as to expand preferentially locally at spaced points on the circumference into contact with the brake drum in response to excessive centrifugal force resulting from overspeed of the engine to develop a braking torque by such contact; and a mutual connection between the braking ring and the rotative member including ramp surface means effective to further expand the braking ring in response to retardation of the braking ring relative to the rotative member effected by the said braking torque to increase the braking torque.

2. A brake as defined in claim 1 in which the ramp surface means is defined by diametrically opposite ramps on the interior of the braking ring and diametrically opposite cams on the rotative member.

3. A brake as defined in claim 1 in which the braking ring is a light press fit on the rotative member.

4. A brake as defined in claim 1 in which the braking ring has a substantially circular exterior cross-section and a roughly elliptical interior cross-section.

5. A brake as defined in claim 1 in which the braking ring has two diametrically opposite portions of greater radial thickness than the remainder of the ring.

6. A brake as defined in claim 5 in which the exterior cross-section of the braking ring is circular.

7. A brake as defined in claim 5 in which the said opposite portions define slots extending axially of the ring to reduce locally the stiffness of the ring.

8. A brake as defined in claim 7 including weights mounted in the said slots to increase the centrifugal force acting on the braking ring.

9. A brake as defined in claim 8 in which the weights are of a material of greater density than the ring.

10. A brake as defined in claim 1 including weights of a material denser than the braking ring fixed to the ring to augment the centrifugal force on the ring.

References Cited

UNITED STATES PATENTS

| | | | |
|---|---|---|---|
| 1,324,346 | 12/1919 | Gormley | 188—185 |
| 1,600,346 | 9/1926 | MacMurchy. | |
| 2,962,257 | 11/1960 | Allingham. | |
| 2,966,333 | 12/1960 | Flanagan. | |
| 3,149,702 | 9/1964 | Popper | 188—185 |
| 3,204,737 | 9/1965 | Anner | 188—185 X |
| 3,271,005 | 9/1966 | Jones. | |

EVERETTE A. POWELL, JR., Primary Examiner

U.S. Cl. X.R.

415—18